UNITED STATES PATENT OFFICE.

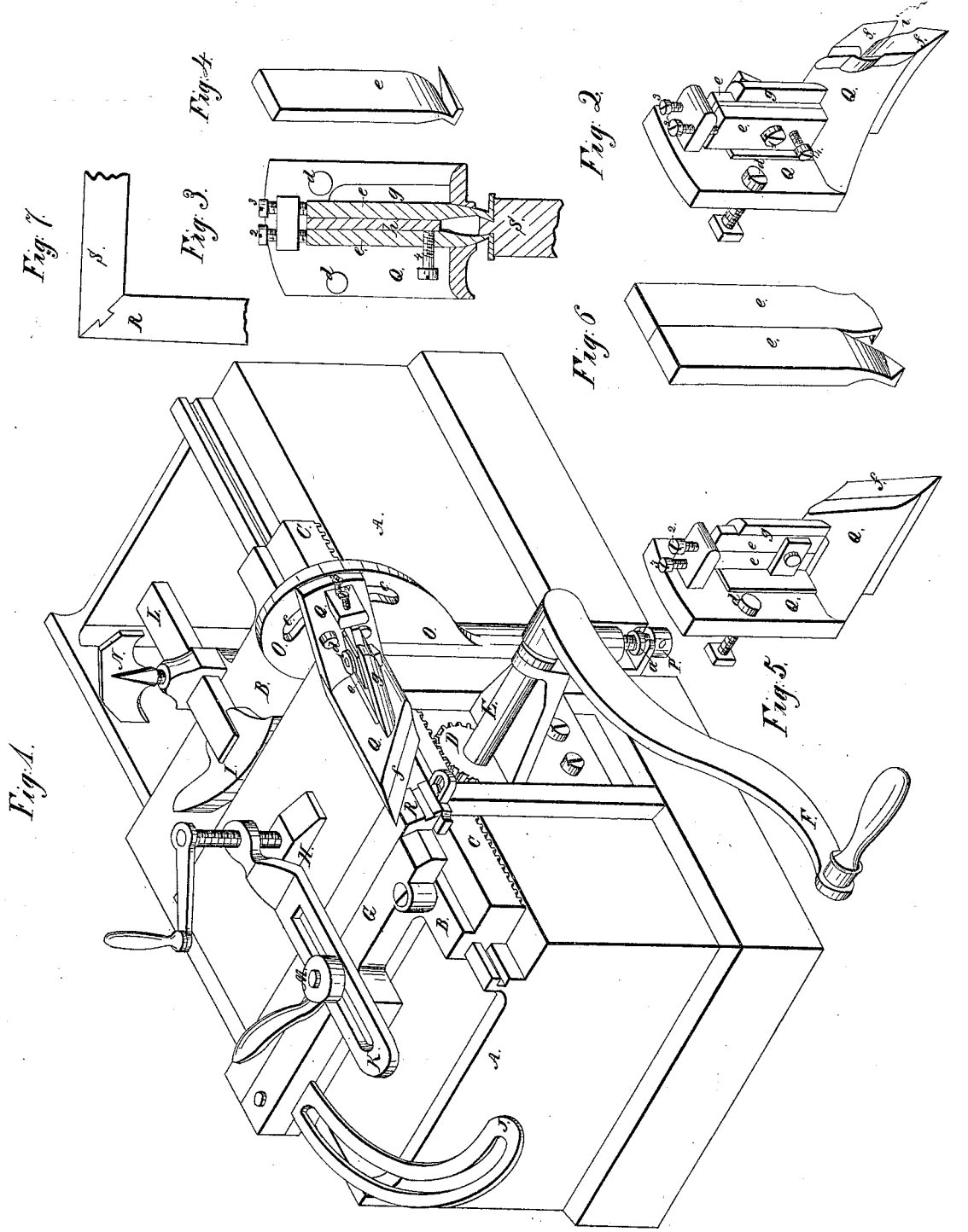

ELBRIDGE G. MATTHEWS, OF CLEAR WATER, MINNESOTA, ASSIGNOR TO HARVEY CHURCH, OF TROY, NEW YORK.

MACHINE FOR CUTTING DOVETAILS AND THEIR GROOVES.

Specification of Letters Patent No. 16,627, dated February 10, 1857.

*To all whom it may concern:*

Be it known that I, ELBRIDGE G. MATTHEWS, of Clear Water, in the county of Wright, Minnesota, have invented certain new and useful Improvements in Machines for Cutting Miters and Dovetails on Wood, &c.; and I do hereby declare the following to be a full, clear, and exact description of the same, reference being had to the accompanying drawings, making a part thereof, in which—

Figure 1 represents a perspective view of the entire machine. Figs. 2, 3, 4, 5 and 6, represent detached portions thereof, which are not so clearly seen in Fig. 1. Fig. 7, represents a miter and dovetail, as cut by the machine, and united together, to illustrate the character of the machine.

Similar letters where they occur in the several figures denote like parts in all.

The nature of my invention consists in so combining a traveling carriage, with a stationary, or series of stationary, cutters, as that by running the carriage toward the cutters, a miter and dovetail shall be cut upon the end of the wood arranged thereon for that purpose, and at such angle thereto as may be required.

To enable others skilled in the art to make and use my invention, I will proceed to describe the same with reference to the drawings which represent a hand machine, though it is obvious that it may be run by any other power when used for heavy work.

A, represents a bed or table, upon suitable ways in or on which a carriage B, may be moved back and forth. A straight rack C, is attached to the carriage, into which a pinion D, on the crank shaft E takes, said crank-shaft being driven by the crank F, or by any other well known means. A bar G, is attached to the carriage, against which the board or strip to be mitered or dovetailed is placed, and securely fastened by the screw clamps H I, one or both as its shape or character may require. This bar G, is secured to the carriage by screws so as to admit of an adjustment on the carriage for the purpose of cutting or forming the miter and dovetail on the piece of wood at variable angles when so desired. A slotted arc or arm J, is also connected to the bar G, so that when the said bar is properly adjusted to the desired angle, it may be firmly held there, by a set screw passing through the slot in said arc or arm J, and into the carriage. The screw clamps H, I, are made adjustable by means of their shanks K, L, and the tightening screws M, N, so that the piece of wood to be operated upon, may be firmly held to the carriage, and the gage bar, both.

To the side of the table or bed A, is attached a head-block, or knife stock O, by means of set screws, passing through slots therein, into the table (not seen in the drawing); and a raising and lowering screw P, having a collar $a$ upon it, between which collar, and the head of the screw a forked stop $b$ is arranged, so that the said head block, or knife stock O, may be adjusted with the greatest nicety, in a vertical position, by first unloosening the set screws, and then turning the screw P.

A curved slot $c$ is formed in the head block O, through which pass, the screws $d, d$, for holding the knife-stock proper, (Q), to the head block O, and so that the knives or bits $e, f$, connected to said knife stock Q, as well as the stock itself may be adjustable on the head block, to change the angle or inclination of the miter and dovetail, to suit the character of the work to be done. The knife stock Q, is of an L form, and on its bottom part or sole, is fixed the mitering knife or bit $f$. This knife has an inclined edge, so as to give a "draw-cut" as it were to the passing wood, or other material; and to the upright or stem part of the stock Q, which has a supporting plate $g$ wrought or cast upon it, is arranged the bits for cutting the dove-tails upon the miter previously cut by the bit $f$. These dovetailing bits are, provided with set screws 1, 2, 3, 4, for holding, moving, and adjusting them to any special work. The same stock, may be used for holding the different bits used in cutting the male and female dovetail, but as a matter of economy, and saving of time, I connect the bits to their own special stock, each, and remove, and replace the stocks, bits and all. The bits of course must have in reverse, the form of dovetail which they are to cut upon the wood, and those for cutting the male, or tongue, as seen in Figs. 2, 3, have a plate $h$, between them, against which the set screw 4, passing through one of the bits $e$, bears, this being for the purpose of regulating the male dovetail or tongue, to the female dovetail or groove, it being necessary that one set or pairs of the bits, should have this adjustment to make neat work.

As represented in Fig. 1, the machine is arranged for cutting the female dove-tail or groove, as seen upon the piece R, Fig. 7. In this case the bits seen at Figs. 5, 6, (on an enlarged scale) are used—the one *f*, cutting the miter, and those *e*, *e*, which have their lips reversed for the purpose, taking out, one half each, of the groove.

When the male dove-tail, or tongue is to be formed on the wood, then the stock and bits seen at Figs. 2, 3 and 4 are substituted. In this case, instead of the bit *f*, (which forms the miter), having a straight cutting edge, it has a serrated one, as seen at *i* Fig. 2, the object of this being, to enable said bit *f*, to cut the miter on each side of the tongue, and leave wood enough out of which the tongue is to be formed. But in this case as well as in the former one, the cutting edges of the bit *f*, are all inclined, so as to preserve the draw cut through the wood. In Fig. 3, is clearly seen the shape and action of the bits *e e*, upon the wood S, and in Fig. 7, the piece S, is shown as united to the one R, by the miter and dovetail, forming a right angle, but any other angle may be as readily made, by shifting the guide piece G, as heretofore described.

I am aware that precisely such a miter and dovetail joint, as I have represented has been heretofore made and used, and although I do not know the fact, I presume that, bits have been arranged for cutting and forming them similar, or substantially so, to what I use. I am also aware that, traveling or moving bits, circular saws, and revolving cutter heads, have also been used in cutting miters and dovetails. I claim none of these things, having ascertained that to make the bits stationary, and to force the wood past them, not only simplifies and cheapens the cost of the machine, but saves power, and does better work than any tool can do, that has motion communicated to it. It may be asked in what particular my machine differs from an ordinary tonguing and grooving machine where the board is carried past the tonguing and grooving cutters. To this I answer that in such machines, the tongues and grooves, are formed on the edge of the board; they are not cut under, as a dovetail must be; there is no mitered edge which can be varied to suit a variety of shop work. In a word neither machine is adapted for, nor can do the work of the other.

Having thus fully described the nature of my invention, what I claim therein as new and desire to secure by Letters Patent, is—

1. In combination with the fixed stock Q, the mitering knife *f*, and scoring and cleaning knives *e*, *e*, as herein set forth, for forming at one operation the miter and dovetail tongue or groove.

2. I also claim in combination with the fixed stock, and mitering and dove-tailing cutters above described, the traversing of the block or board in a clamped condition past the same, for the purpose of having the miter and dovetail formed therein as set forth.

ELBRIDGE G. MATTHEWS.

Witnesses:
J. H. TALBOT,
WILLIAM SELLEW.